No. 642,058. Patented Jan. 23, 1900.
G. D. WORSWICK.
ADJUSTABLE LOAD GATE.
(Application filed Nov. 4, 1899.)

(No Model.) 2 Sheets—Sheet 1.

Witnesses.
Robert Everett
Dennis Sumby

Inventor.
George D. Worswick.
By James L. Norris.
Atty.

THE NORRIS PETERS CO., PHOTO-LITHO., WASHINGTON, D. C.

No. 642,058. Patented Jan. 23, 1900.
G. D. WORSWICK.
ADJUSTABLE LOAD GATE.
(Application filed Nov. 4, 1899.)
(No Model.) 2 Sheets—Sheet 2.
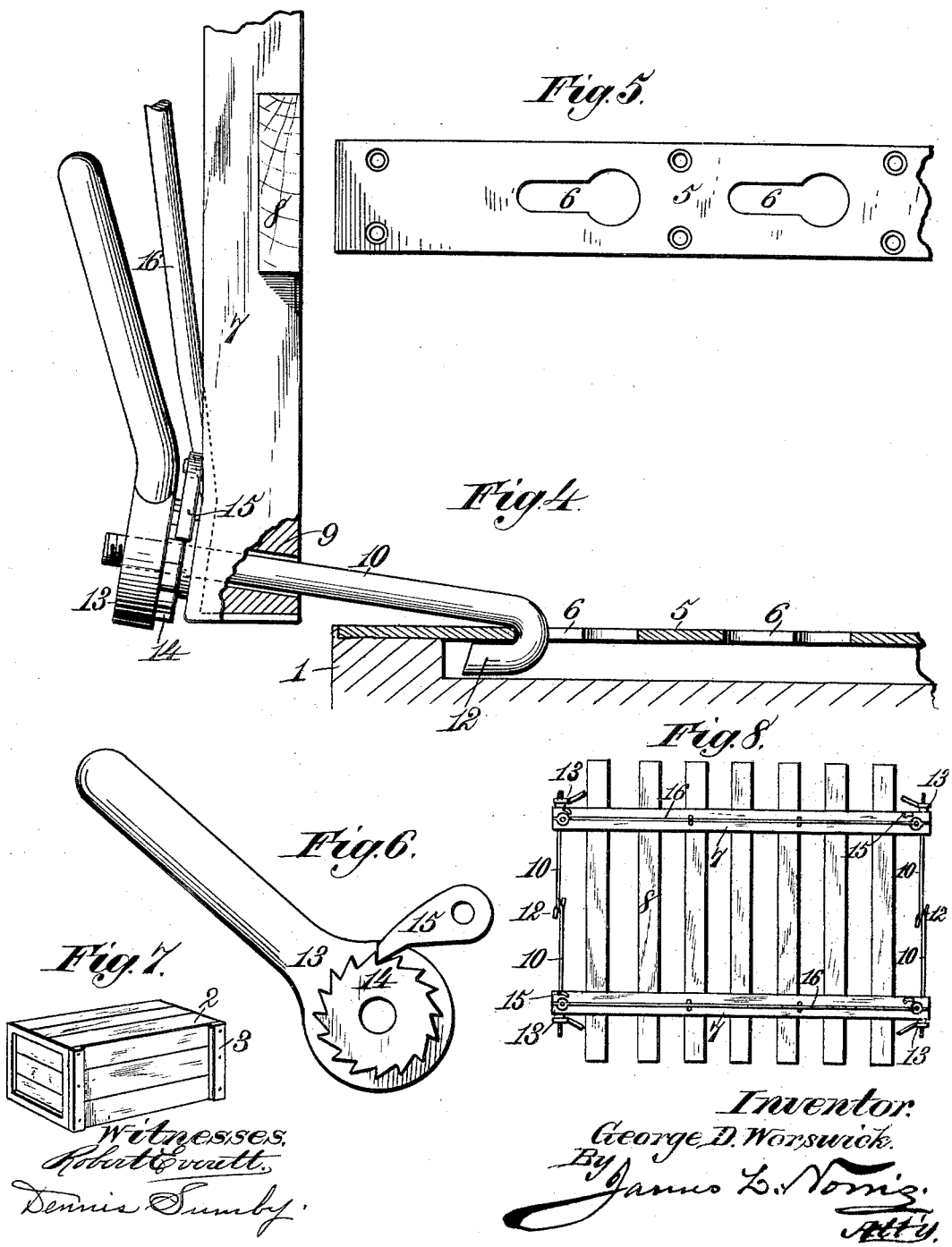
Witnesses
Robert Everett
Dennis Sumby
Inventor
George D. Worswick
By James L. Norris
Atty of the page.

UNITED STATES PATENT OFFICE.

GEORGE D. WORSWICK, OF SAN JOSÉ, CALIFORNIA.

ADJUSTABLE LOAD-GATE.

SPECIFICATION forming part of Letters Patent No. 642,058, dated January 23, 1900.

Application filed November 4, 1899. Serial No. 735,825. (No model.)

*To all whom it may concern:*

Be it known that I, GEORGE D. WORSWICK, a citizen of the United States, residing at San José, in the county of Santa Clara and State of California, have invented new and useful Improvements in Adjustable Load-Gates, of which the following is a specification.

My invention relates to adjustable load-gates for securing the whole or any part of a car-load or ship's cargo in position and retaining the same in place during transit.

It is my purpose to provide novel and simple means whereby a car-load of merchandise—such, for example, as perishable fruit—or any part of a car-load less than the whole may be securely held in place or in a fixed position during transportation and quickly released at a terminal point or way-station to enable the whole or a portion of the load to be discharged.

It is a further purpose of my invention to provide simple means for use in handling fruit or other merchandise when loading, transporting, or unloading the same, whereby I secure a material economy in time and labor, preserve the fruit or other material from deterioration or injury due to displacement by the motion or vibration of the car, and enable any part of the contents of the latter to be discharged at one or more intermediate points without affecting the security of the portion remaining on board.

My invention is also intended to serve the same purposes on board a ship in relation to the cargo or to portions of the latter.

I also aim to accomplish other novel and useful results, all of which will be fully described in the following specification and then particularly pointed out and defined in the claims.

For the purposes of the following description reference is had to the accompanying drawings, in which—

Figure 1:
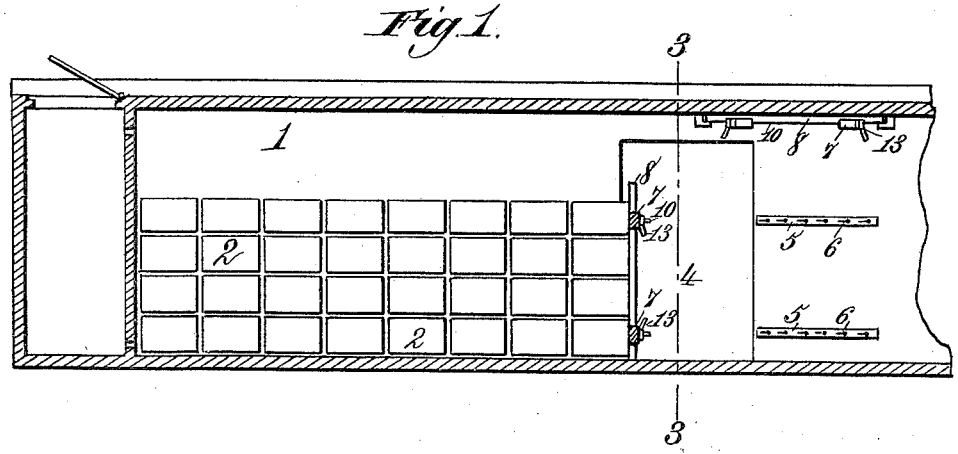
Figure 2:
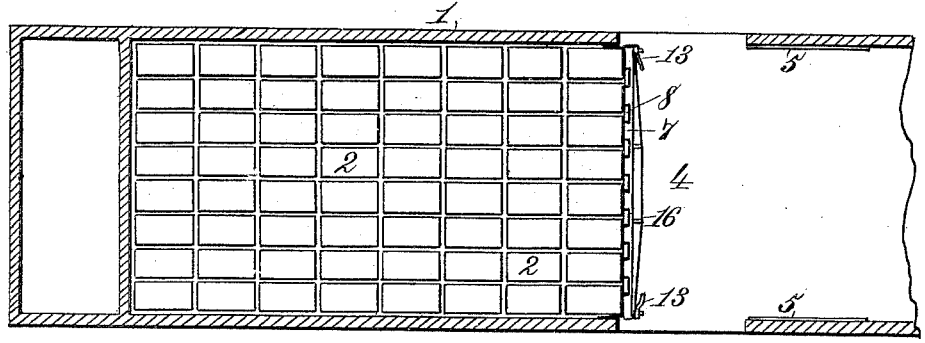
Figure 3:
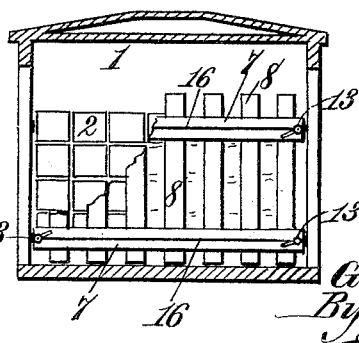

Figure 1 is a vertical longitudinal section showing part of the interior of a railway-car equipped with my invention. Fig. 2 is a plan view of the same. Fig. 3 is a transverse section upon the line 3 3 in Fig. 1, the load-gate being partly broken away. Fig. 4 is a detail view on an enlarged scale, showing one end of the load-gate and one of the adjustable fastenings. Fig. 5 is a detail view of the fastening-plate shown in Fig. 4. Fig. 6 is a view of one of the lever-nuts, showing its ratchet and holding-pawl. Fig. 7 is a perspective view showing an ordinary fruit-box or crate. Fig. 8 is a front elevation of a load-gate, showing the manner of stowing and securing the hook-bolts when the gate is not in use.

The reference-numeral 1 in said drawings indicates the body of any ordinary freight-car, which in the present instance is shown as a refrigerator-car for the transportation of perishable articles, such as fruit, packed in boxes 2 of any preferred form. When loaded, these boxes are piled in the interior of the car, as shown, a sufficient air circulation being insured by the narrow spaces between them formed by slats or strips 3, nailed to one side of each box in the usual manner. When a car is fully loaded, its interior space is filled with the exception of a narrow passage 4 between the side doors.

Along each side of the interior of the car are arranged two or more horizontal fastening-plates 5, separated from each other by a suitable distance and each consisting of a strip of metal provided at frequent intervals with keyhole-slots 6.

The load-gate is formed of two or more horizontal bars 7, having a length somewhat less than the width of the interior space of the car. To these bars at suitable intervals are attached vertical slats or strips 8, preferably set in mortises, so as to form a flush surface with the inner faces of the bars 7. Through openings 9 in the ends of the latter are loosely passed the threaded ends of bolts 10, their other ends being formed into hooks 12 to engage the keyhole-slots in the fastening-plates 5. Upon the threaded ends of said bolts are turned lever-nuts 13, having ratchets 14, with which holding-pawls 15 engage. These pawls are pivoted on the bars 7 and serve to prevent the nuts from working loose by the strain. A truss-rod 16 engages the bolts 10 with its ends to prevent the bar 7 from yielding to the strain upon its middle portion.

In use the load-gate is placed against the piled tiers of boxes, the hooked ends 12 of the bolts 10 are inserted in the keyhole-slots 6 in the fastening-plates 5, the latter being removed a little from the walls of the car to permit the entrance of the hooks, and the nuts 13 are then turned up by means of their levers until a suitable strain is produced. When not in use, the load-gates may be stowed in racks overhead, as seen in Fig. 1, or otherwise disposed of. To prevent the bolts 10 and lever-nuts 13 from being lost by becoming displaced or detached, said bolts are removed from the openings 9 in the ends of the bar 7, their hooked ends are engaged, and they are brought parallel with the slats 8, their threaded ends projecting above and below the end of the upper and lower bar 7, as shown in Fig. 8 of the drawings. One or both of the lever-nuts 13 are then turned up sufficiently to prevent the hooks from disengaging, a very moderate tension upon the bolts 10 being sufficient for this purpose.

Those familiar with railway transportation, especially in the case of fruits or other perishable matter, will readily understand that load-gates similar to those heretofore described are capable of use for retaining any portion of a car-load in proper position in case another portion should be discharged at a way-station. So, also, in loading a car if it becomes necessary to move the latter—as, for example, to switch it upon another track—before the loading is completed the load-gates may be used to keep that part of the load already on board in its proper position. Other circumstances also will readily suggest themselves in which this invention will be of great utility and will effect a marked economy of both time and labor. It may be used with many other classes of merchandise besides fruit and upon any kind of box-car, as well as upon refrigerator-cars. Moreover, it is well adapted for use upon ships to preserve cargo or parts of the same in proper position in the hold. By its use the shifting of cargo, which has been such a frequent cause of vessels foundering, could in very many cases be effectually prevented, and its use involves no sacrifice of space, requires no skill or experience, and involves no appreciable expenditure of time or labor, as one man can attach or remove one of the load-gates in two or three minutes. They can be constructed also at a very low cost and under ordinary circumstances will be capable of continuous use for a number of years before wearing out. It is evident also that I may make the load-gate of metal or any other material suitable for the purpose and that instead of the horizontal and vertical bars composing the same I may use any other construction capable of accomplishing like results in a satisfactory manner.

Having thus described my invention, what I claim, and desire to secure by Letters Patent of the United States, is—

1. An adjustable load-gate, for securing merchandise in place in cars or upon ships, said gate consisting of a rigid structure adapted to support the strain of the load during transportation, hook-bolts adjustable in the ends of said gate and adapted to engage rigidly-attached fastening-plates arranged in the compartment containing the merchandise, and means for placing said hook-bolts under strain to draw the gate forcibly against the material it is to maintain in place, substantially as described.

2. A load-gate for maintaining merchandise in its proper, loaded position during transportation by rail or water, said gate consisting of a rigid structure adapted to support the strain of the said merchandise caused by the movements of the vehicle or vessel, fastening devices at suitable points upon said gate to engage rigidly-attached fastening-plates in the compartment containing the merchandise, means for adjusting said fastening devices on said plates at different points and means for placing said fastening devices under strain to draw the load-gate forcibly against said merchandise, the said means serving to retain said merchandise in place at any point in the movement of said gate, substantially as described.

3. The combination with a transportation-compartment having fastening-plates rigidly secured to its walls, of one or more load-gates, each consisting of a rigid structure adapted to extend from wall to wall of said compartment or nearly so, hook-bolts having threaded ends which pass loosely through openings in said gate, their hooked ends engaging slots formed at intervals in the fastening-plates, and nuts turned upon the threaded ends of said bolts and bearing against the outer face of the gate, to draw the latter against the stowed merchandise with suitable pressure, substantially as described.

4. The combination with two or more fastening-plates, each having a series of slots and arranged rigidly along the walls of a compartment in which merchandise is stowed for transportation, of one or more load-gates each adapted to extend from one fastening-plate to, or nearly to, the other, hook-bolts having threaded ends lying loosely in openings in those parts of each gate adjacent to the fastening-plates, the hooked ends of said bolts engaging the slots in the latter, lever-nuts turned upon the threaded ends of said bolts and bearing against the outer face of the gate, and holding-pawls to retain said nuts at the points to which they are adjusted, substantially as described.

5. The combination with a refrigerator or other car for the transportation of freight, of two or more fastening-plates arranged horizontally along each of the longer walls of said car, each plate being provided with a series of openings, a load-gate extending from side to side of the car, or nearly so, bolts having hooked ends to engage the openings in the fastening-plates and threaded ends passing loosely through openings in the ends of the load-gate, nuts turned upon said threaded ends and bearing against the outer face of the load-gate, means for holding said nuts at any point to which they are turned, and one or more truss-rods to stiffen said gate, substantially as described.

6. The combination with a car for transporting fruit, of fastening-plates arranged along each of its longitudinal walls, said plates having openings at suitable intervals, a load-gate consisting of two or more horizontal bars supporting a series of vertical cleats, or slats, bolts having threaded ends lying loosely in openings in said horizontal bars and hooked ends engaging openings in the fastening-plates, nuts having levers and turned upon the threaded ends of said bolts and bearing against the outer faces of the bars, and pawls engaging ratchet-teeth on said nuts to prevent displacement due to strains, said gate being adapted to be drawn against the outer of a series of tiers of fruit-boxes piled in said car, substantially as described.

In testimony whereof I have hereunto set my hand in presence of two subscribing witnesses.

GEORGE D. WORSWICK.

Witnesses:
W. B. HAYFORD,
F. C. ENSIGN.